Dec. 13, 1932.  A. J. MICHELIN  1,890,546
VEHICLE WHEEL
Filed April 7, 1930  2 Sheets-Sheet 1
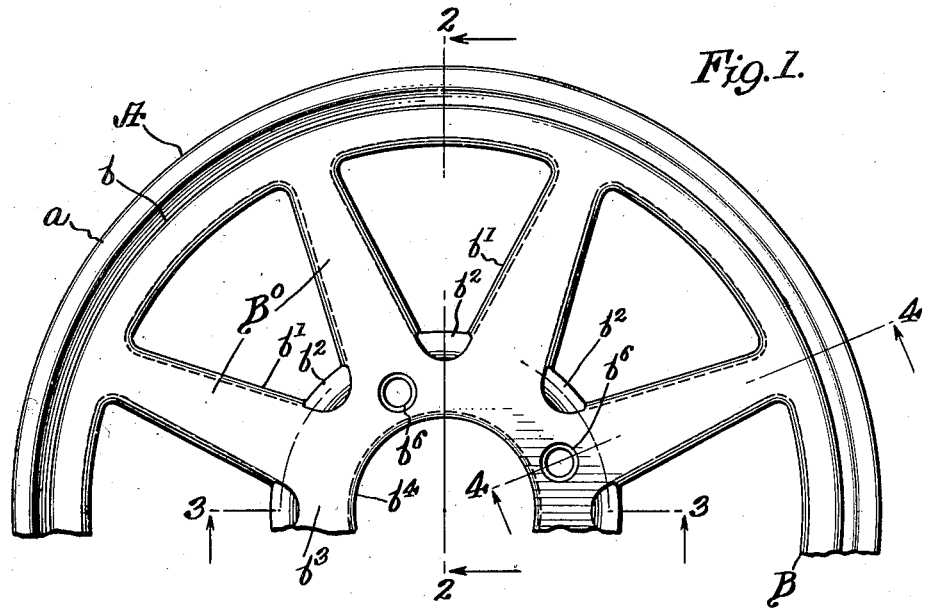
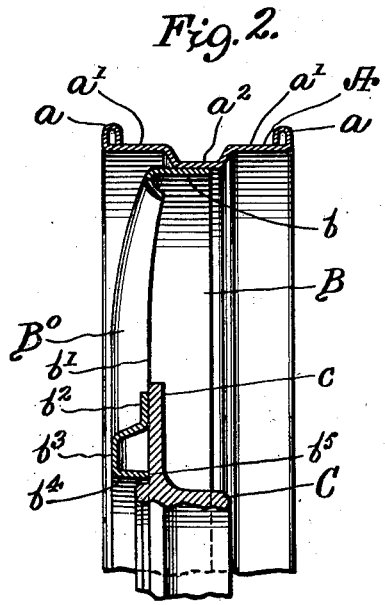
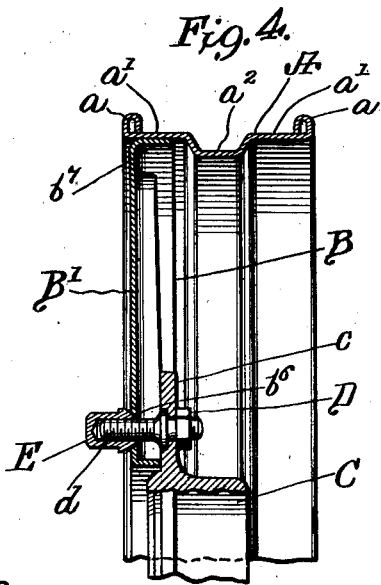
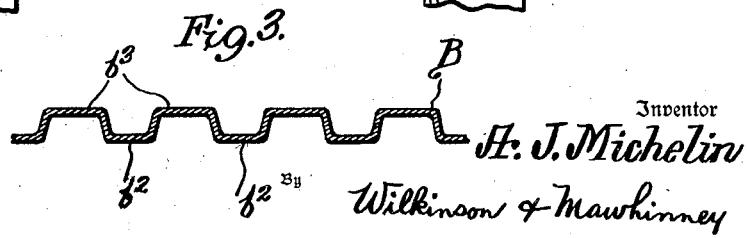
Inventor
A. J. Michelin
By Wilkinson & Mawhinney
Attorneys.

Dec. 13, 1932.   A. J. MICHELIN   1,890,546
VEHICLE WHEEL
Filed April 7, 1930   2 Sheets-Sheet 2
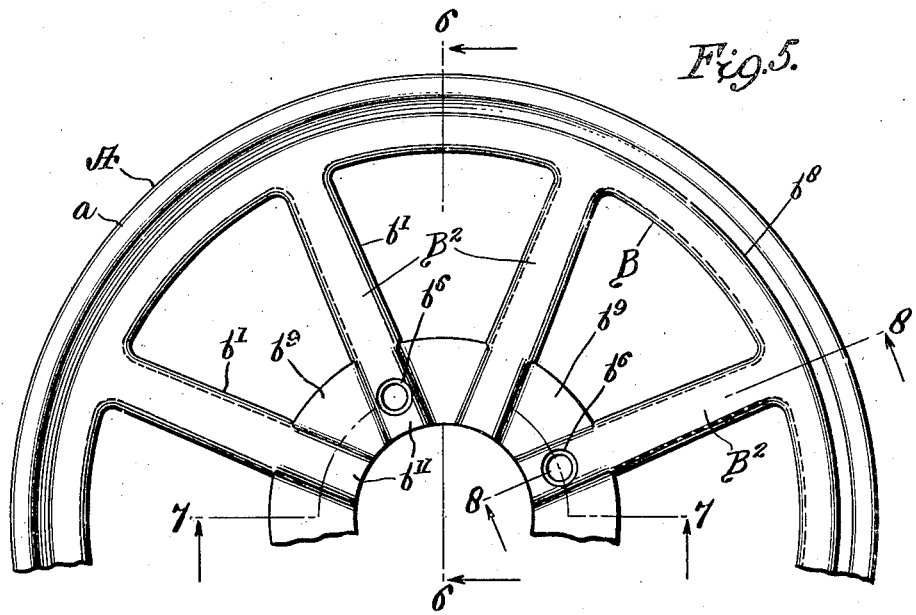
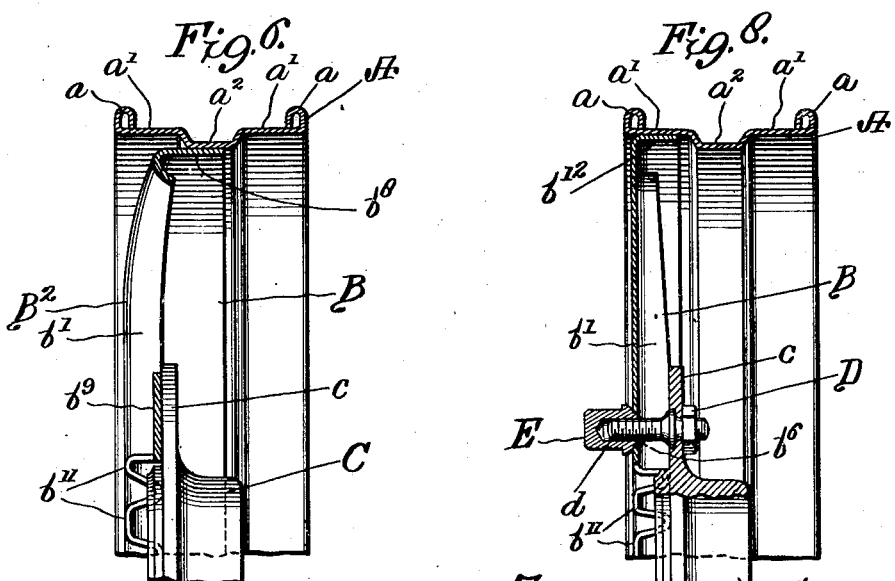
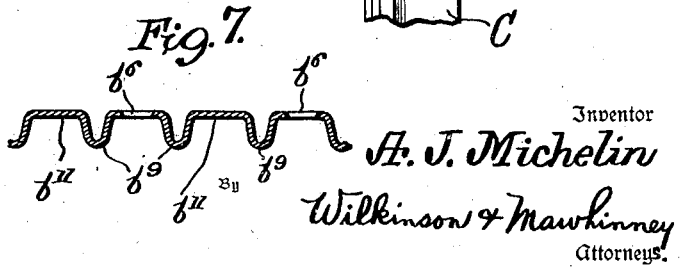
Inventor
A. J. Michelin
Wilkinson & Mawhinney
Attorneys.

Patented Dec. 13, 1932

1,890,546

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

VEHICLE WHEEL

Application filed April 7, 1930. Serial No. 442,309.

My present invention relates to improvements in vehicle wheels, and it is intended to provide a vehicle wheel having a metal body with the spokes integral therewith, with certain features shown in the construction and arrangement of parts that will be herein more fully described.

My present invention is intended for an improvement over the construction shown in my earlier U. S. Patent, No. 1,376,390, granted April 26, 1921, entitled improvements in demountable wheels, and the construction shown in my U. S. Patent No. 1,750,483, granted March 11, 1930, entitled improvements in vehicle wheels.

In the former constructions are described modes of fixing the wheel to the hub by means of nuts, which are secured into a flange forming part of the hub. The pressure developed by the screwing up causes the wheel body to fit snugly against the hub flange, and this invention differs from the former inventions as follows:

In the patent aforesaid, the hub and wheel surfaces on which the contact pressure is exerted are in a fairly extensive circular zone, while in the pending application aforesaid, there is a resilient bearing surface arranged between the center portion of the wheel body, and the hollow ribs between the spokes, which are at the inner end of the gaps between the spokes.

The present invention aims only at an improvement in the latter method, and consists of providing metal bearing surfaces between the spokes adjacent the hub, so as to increase the bearing on the hub flange.

My invention will be more fully understood after reference to the accompanying drawings, in which like parts are indicated by similar reference symbols throughout the several views, and in which, Figure 1 shows a front elevation of half of a wheel body, carrying the metal rim, but detached from the hub.

Figure 2 shows a section along the line 2—2 but includes a section of the hub and its flange.

Figure 3 shows a rolled out section along the curved line 3—3 of Figure 1 of the wheel body.

Figure 4 shows a section along the line 4—4 of Figure 1, looking in the direction of the arrows, with a slight change in the attachment of the rim to the wheel body, and also shows one of the nuts and bolts for securing the wheel body to the hub flange.

Figure 5 is a front elevation similar to Figure 1, but shows a slight modification, and omits the hub of the wheel.

Figure 6 shows a section along the line 6—6 of Figure 1, but shows the hub and its flange in elevation.

Figure 7 shows a section of the wheel body along the curved line 7—7 rolled out straight, and Figure 8 shows a section along the line 8—8 of Figure 5, with a slight change in the attachment of the wheel body to the rim, and this view also shows one of the bolts and fastening nuts for fastening the wheel body to the rim of the hub.

Reverting now to Figures 1 to 3, A represents the metal rim which may be of any desired or preferred form, but, as shown, consists of a metal band having the usual side flanges $a$, with the shoulders $a'$ for the bead of the tire, and with the usual central groove $a^2$ for the deep rim tire. Mounted in this rim is the wheel body B, which in Figure 2 is shown as provided with an annular flange $b$, which is riveted or otherwise secured to the central portion of the rim, as shown in Figures 1 and 2. Adjacent this flange, the wheel body is cut away, so as to form spokes $B^o$, and the sides of these spokes are bent inwards, as shown at $b'$ in Figure 2.

This turned over portion of adjacent spokes ends near the hub in a plane bearing surface $b^2$, which forms the outer portion of the hollow annular rib $b^3$, the inner edge of which rib is preferred in the form of a cylinder $b^4$ having the edge $b^5$ in the same plane with the bearing surface $b^2$, and thus constitutes a second bearing surface for the hub flange $c$ of the hub C. This hollow annular rib is provided with the series of bolt holes $b^6$. There may be one of these bolt holes for each spoke, or one for each alternate spoke, or less, if desired but one for two spokes is preferred. These bolt holes are preferably concave or tapered as shown in my patent aforesaid, but may be of any suitable construction.

The bolts D shown in Figure 4 are rigidly attached to the hub flange c, and have the engaging ends d attached to the locking nuts E, which are preferably concave or tapered, as described in my patent aforesaid. The construction shown in Figure 4 differs from that shown in Figures 1 and 2, only in that the wheel body $B^o$ is less dished, and has its outer flange $b^7$ engaging under one of the shoulders of the rim A; otherwise, the construction is the same.

Reverting now to Figures 5 to 7, the wheel body $B^2$ is provided with the deep annular flange $b^8$ to engage the central portion of the rim A, and the flanges $b'$ of the adjacent spokes terminate in plane bearing surfaces $b^9$, the desired resiliency for the nuts and bolts in this case being provided by the hollow portion $b^{11}$ of each spoke. Bolt holes $b^6$ are provided in a plurality of the spokes, preferably every other spoke, as shown in Figures 5 and 7.

These bolt holes are preferably concave or tapered, as described in my patent aforesaid, and the locking bolts D and nuts E are similar to those already described. The construction shown in Figure 8 is similar to that shown in Figures 5 to 7, except that the wheel body is less dished, and that its outer flange $b^{12}$ is fastened to the rim by welding, or otherwise, under one of the shoulders thereof.

The bearing surface between the inner part of the spokes may not extend as far as the central opening of the wheel body, or may extend as far as said hole if desired.

In any event, it will be seen that a wheel body is secured, which is provided with bearing surfaces adapted to engage the flange of the hub, and with resilient bearing surfaces for the fastening bolts and nuts, whereby the desired securing of the nuts to the wheel under resilient compression is secured.

The shape and extent of the supports between the spokes may be modified at will within desired limits and may extend as far as the central supporting crown, as previously stated, which permits of an arrangement of a kind of corrugation, and improves the appearance of the wheel. According to the present invention, the thinned edge of the perforated disk is secured under one of the flanges of the rim, being riveted or welded to the latter, so as to buttress the said edge and the disk of which it forms a part against the groove.

The result of this is both an increase of strength and a new possibility of realizing a wheel with straight spokes completely enveloping the brake drum. The drum can then be placed in the middle plane of the wheel, thus facilitating the dynamic balancing of the revolving whole, and providing a remedy against vibration, as also a better solution of steering problems.

It will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:—

1. In a wheel the combination of a rim, a hub having a radial flange, and an intermediate sheet metal spoke portion engaging the rim and constructed with a hollow hub, said hollow hub having a central cylindrical portion with its edge engaging the wheel hub flange, and having radially disposed flange portions between the spokes lying in contact with a face of the wheel hub flange, substantially as set forth.

2. In a wheel the combination of a rim, a hub having a radial flange, and an intermediate sheet metal spoke portion engaging the rim and constructed with a hub portion, said hub portion having a plurality of radially disposed flanges located intermediate the spoke portions and lying in contact with one side of the wheel hub flange, and bolts passing through the hub flange and said hub portion, substantially as set forth.

ANDRÉ JULES MICHELIN.